Patented Mar. 6, 1928.

1,661,887

UNITED STATES PATENT OFFICE.

HANS WERNER FIEDLER, OF LEIPZIG, GERMANY.

METHOD OF AND MEANS FOR PRESERVING VULCANIZED RUBBER.

No Drawing. Application filed September 3, 1924, Serial No. 735,630, and in Germany September 13, 1923.

The object of this invention is to provide means for preventing or retarding that change in the constitution of vulcanized rubber, which occurs with age and is manifested by the appearance of brittleness and fissures, this change being accelerated when the rubber is subjected to rotation causing increase of temperature. According to the invention the preservation of the rubber is effected by counter-acting the positive catalytic effect on the oxidation of the sulphur in the oxidized rubber, due for example to minute traces of copper, zinc lead or their oxides, by treating the rubber with a substance or mixture of substances which has a negative catalytic effect on the oxidation of the sulphur.

A very effective preservative of rubber is, for example, a mixture of glycerine and benzaldehyde. Solutions of phenylhydrazin and glucose are also suitable for the purpose.

These substances may be used together with a solution of unvulcanized rubber. The effect then obtained by rubbing the preservative into existing fissures is to close the fissure by a kind of after-vulcanization.

The following is a method of preparing a preservative for rubber, containing glycerine and benzaldehyde, and a solution of unvulcanized rubber in paraffin oil.

600 gr. paraffin oil and 60 gr. raw rubber are heated to 140° C. in an autoclave, for four hours, with continual stirring. Separately therefrom 1300 gr. talcum are mixed intimately with a mixture of 172 gr. glycerine and 34 gr. benzaldehyde, the homogeneous mixture being added gradually to the raw rubber solution at 140° C. For this purpose a cooling funnel is used, which at once condenses any distillate seeking to escape. When an intimate mixture has been made the autoclave is closed again, and the temperature is raised to 180° C. After stirring for about 2 hours the paste in the autoclave is allowed to become cool.

A suitable way to use the preservative is to first clean the rubber well by brushing it with cold water and then rubbing it with benzol, and then applying with a hard brush a thin, uniform layer of the paste, which is allowed to sink in for about half an hour.

What I claim as my invention and desire to secure by Letters Patent of the United States is:—

1. The process of preserving vulcanized rubber consisting in treating the rubber with a mixture of glycerine and benzaldehyde.

2. The process of producing a paste for preserving vulcanized rubber, consisting in mixing glycerine benzaldehyde and talcum, introducing the mixture into a solution of raw rubber in paraffin oil at about 140° C., and then raising the temperature of the solution to about 180° C.

In witness whereof I have signed this specification.

HANS WERNER FIEDLER.